(No Model.)
J. C. RAY.
LEVEL AND PROTRACTOR.
No. 304,237. Patented Aug. 26, 1884.
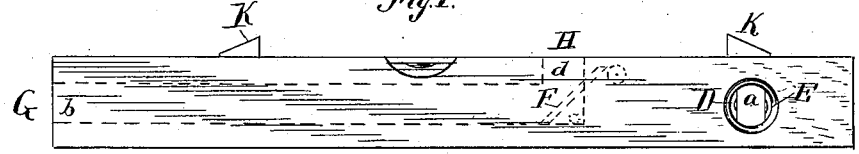
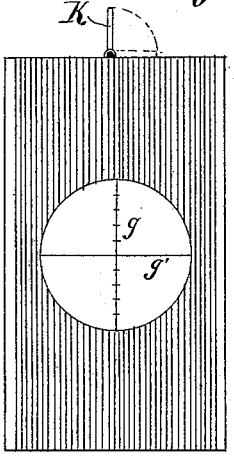
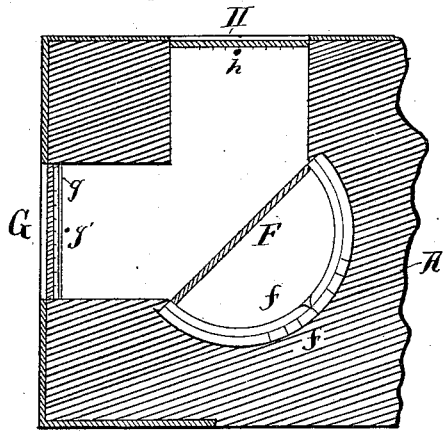
Witnesses
C. H. H. Brown
J. Charleton Ingram
Inventor
John C. Ray
By Wallace A. Bartlett
His Atty.

UNITED STATES PATENT OFFICE.

JOHN C. RAY, OF WASHINGTON, DISTRICT OF COLUMBIA, ASSIGNOR OF ONE-HALF TO WM. J. KLINE, OF SAME PLACE.

LEVEL AND PROTRACTOR.

SPECIFICATION forming part of Letters Patent No. 304,237, dated August 26, 1884.

Application filed May 27, 1884. (No model.)

*To all whom it may concern:*

Be it known that I, JOHN C. RAY, residing at Washington, in the District of Columbia, have invented certain new and useful Improvements in Level and Protractor, of which the following is a specification, reference being had therein to the accompanying drawings.

This invention relates to levels for the use of carpenters and masons; and it consists in certain improvements, hereinafter pointed out and claimed, whereby a horizontal or perpendicular line may be protracted indefinitely, and under certain circumstances and within limits lines other than horizontal found and elevations determined.

The object of the invention is to produce a builder's implement which will answer as a level, and also to a considerable extent as a plummet, a protractor, and a bevel-gage.

In the drawings, Figure 1 is a side elevation of a level or instrument embodying my invention. Fig. 2 is a longitudinal central section of same. Fig. 3 is a plan or top view. Fig. 4 is a view of the end which bears the protractor. Fig. 5 is a longitudinal section of a portion of the level with a modified reflecting-protractor.

A indicates the body of the level, which has the usual spirit-tube and bubble at B, and an additional transverse tube, C. The body is rectangular, and, in addition to the usual upright tube D in the mortise $a$, has an additional bubble-tube, E, in the mortise $a$; or the tube D may be omitted, the tube E being on the opposite side of the mortise $a$ from the usual location of the bubble-tube in the mortise of a level. The body A is bored out longitudinally from $b$ to $c$, and also from $d$ to $c$ at right angles with the first passage. A small plane mirror, F, is placed across the angle $c$, normally at an angle of forty-five degrees with reference to either passage $b$ or $c$. At G there are crossed hairs or wires $g\ g'$, dividing the opening in horizontal and vertical lines. At H there is a wire extending across the passage $d$ transversely of the body A. The perpendicular line $g$ may be the base or center of a scale or index marked on the glass, and the opening into the passage $d$ will also be covered by a transparent glass having an index thereon. (See Fig. 3.)

In the modification, Fig. 5, the mirror F is hung in a frame or plate, $f$, which is arc-shaped, and may be rocked in a bearing or seat, $f'$, the amount of movement being denoted by an index on the plate or its bearing.

The face of the level may have a compass, I, inserted therein, and a sun-dial, K, at or near either end of the body A. The standards of these dials are hinged, so as to turn down flat upon the face of the level. (See Fig. 4.) When turned up, these standards form sights.

For use as a horizontal protractor, the level is placed on any surface and leveled, the bubbles in tubes B and C serving to indicate when the level is found. The line of sight from wire $h$ to the mirror F (at forty-five degrees thereto) and to wire $g'$ will then follow a horizontal plane intersected by the line or wire $g'$. At the same time the wire or line $g'$ will be in a vertical plane. When a point out of level is to be sighted, the adjustable mirror, Fig. 5, is used, and the body A having been leveled as before described, the mirror is swung to the desired angle of elevation or depression, and the sight taken over the corresponding indices at G H.

To determine the extent of projections overhead—as the eaves of a house, &c.—so as to dispense with a plumb-line, the level is placed in perpendicular position, which is determined by the position of the bubbles in tubes C E. Then a glance over wires $h\ g'$, the mirror being at forty-five degrees, will indicate the vertical position.

The compass enables the sun-dial to be properly placed, and by the two dial-standards acting as sights the sides of a building or boundary may be readily located with reference to the cardinal points.

I am aware that a level has been made with an inclined mirror, which would serve as a horizontal protractor. Such I do not broadly claim.

I claim—

1. The combination, with body A, having the bubble-tubes B and C, arranged as hereinbefore described, of the adjustable mirror F in the perforated body, and the indexes at $g'\ h$, all arranged as shown and set forth.

2. The combination, with the body A of the level, having bubble-tubes B C and sun-dials, arranged as described, of the compass and standards K K, arranged lengthwise of the stock or body, and which may be turned up to serve as sights, or may be turned down out of the way, substantially as set forth.

In testimony whereof I affix my signature in presence of two witnesses.

JOHN C. RAY.

Witnesses:
W. A. BARTLETT,
J. C. LATHROP.